3,065,128
CONDENSATES OF HEXACHLOROCYCLOPENTA-DIENE WITH 1,4-DICHLOROBUTENE-2

Albert H. Haubein, Christiana, Del., assignor to Hercules Powder Company, Wilmington, Del., a corporation of Delaware
No Drawing. Filed Dec. 2, 1954, Ser. No. 472,769
10 Claims. (Cl. 167—30)

This invention relates to new and useful compositions of matter and to insecticidal compositions containing the same.

While condensates of hexachlorocyclopentadiene and various aliphatic unsaturated compounds have shown insecticidal properties, further chlorination of such products has been necessary for commercial success.

The compounds of this invention are produced by heating hexachlorocyclopentadiene with cis- or trans-1,4-dichlorobutene-2 at a temperature in the range of about 80° C. to about 220° C. The product of the reaction with cis-1,4-dichlorobutene-2 which is normally crystalline is more toxic to the common housefly than is the product from trans-1,4-dichlorobutene-2 which is normally an oil.

The method of preparing these products and their use as insecticides is illustrated by the following examples in which all parts are by weight.

Example 1

A solution of 25 parts cis-1,4-dichlorobutene-2 and 55 parts hexachlorocyclopentadiene in 20 parts xylene was heated at about 140° C. for 48 hours. The solvent and unreacted materials were then distilled off at 15 mm. pressure while heating at 100° C. The reaction product amounting to 33 parts was then distilled off at 115–125° C. (0.2 mm. pressure). The distilled product on crystallization from alcohol melted at 102–104° C. and contained by analysis 70.8% chlorine corresponding to a compound of the formula $C_9H_6Cl_8$ (71.3% chlorine).

This compound of the formula $C_9H_6Cl_8$ was dissolved in deodorized kerosene to concentrations of 0.05%, 0.025% and 0.01% and tested as an insecticide against the common housefly. The insecticide of concentrations 0.05% and 0.025% showed 90% knockdown in 2 hours and 100% kill in 24 hours. The insecticide of concentration 0.01% showed 5% knockdown in 2 hours and 86% kill in 24 hours.

Example 2

A mixture of 37 parts trans-1,4-dichlorobutene-2 and 83 parts of hexachlorocyclopentadiene was heated in a sealed glass tube at 200° C. for 72 hours and the product was then distilled, first at 18 mm. pressure to remove unreacted dichlorobutene and then at 0.2 mm. pressure, to remove 9.4 parts unreacted hexachlorocyclopentadiene and recover 34 parts of reaction product boiling at 110–125° C. (0.2 mm. pressure). The reaction product analyzed 71.1% chlorine corresponding to a compound of the formula $C_9H_6Cl_8$ (71.3% chlorine).

This compound of the formula $C_9H_6Cl_8$ produced from trans-1,4-dichlorobutene-2 was dissolved in deodorized kerosene at concentrations of 0.05%, 0.025% and 0.01% and tested as an insecticide. The knockdown of common houseflies in 2 hours was 80%, 60% and 0%, respectively, at these concentrations while the kill in 24 hours was 100%, 98% and 40%, respectively, at these concentrations.

The product of reaction of cis-1,4-dichlorobutene-2 with hexachlorocyclopentadiene is 2,3-bis[chloromethyl]-1,4,5,6,7,7-hexachlorobicyclo-[2.2.1]-5-heptene and is an adduct produced by the well-known Diels-Alder reaction. The corresponding product from trans-1,4-dichlorobutene-2 produced in Example 2 is of unknown structure.

Cis-1,4-dichlorobutene-2 for use in the process of this invention is produced by catalytic hydrogenation of 1,4-dihydroxybutyne-2 to 1,4-dihydroxybutene-2 and subsequent conversion of the hydroxy groups to chlorine groups by reaction with thionyl chloride in pyridine solution. Trans-1,4-dichlorobutene-2 is produced free of the cis isomer by chlorination of butadiene as well as by isomerization of 1,2-dichlorobutene-3.

Cis-1,4-dichlorobutene-2 reacts with hexachlorocyclopentadiene more readily than does the trans isomer at temperatures below about 150° C., and the reaction proceeds as in a normal Diels-Alder type of reaction. The trans-1,4-dichlorobutene-2, on the other hand, reacts quite slowly at temperatures below about 110° C. and does not appear to react as in a normal Diels-Alder type of reaction. With a mixture of cis- and trans-1,4-dichlorobutene-2 it is thus possible to effect selective reaction with cis-1,4-dichlorobutene-2 to obtain the crystalline product. The preferred reaction temperatures are 80°–150° C. for the cis- and 110°–220° C. for the trans-1,4-dichlorobutene-2. The structure of the product resulting from the reaction of hexachlorocyclopentadiene with trans-1,4-dichlorobutene-2 is believed to be an isomer of the product resulting from the reaction of hexachlorocyclopentadiene with cis-1,4-dichlorobutene-2 and the structure is not known with any degree of certainty.

Both the crystalline and the oily products of this invention have maximum insecticidal activity for their particular chemical composition and further chlorination greatly reduces their activity.

Since the product of reaction of hexachlorocyclopentadiene with cis-1,4-dichlorobutene-2 has the greater insecticidal activity, it is preferred for this utility.

The insecticidal compostions of this inventon are produced by admixing the adducts of this invention with a suitable adjuvant which is an inert material to facilitate the mechanical distribution of the toxicant. Inert materials to facilitate the mechanical distribution of the toxicant are added for the purposes outlined in Frear (Chemistry of Insecticides, Fungicides, and Herbicides by Donald E. H. Frear, Second Edition, 1948, page 5) to form sprays, dusts, and aerosols from the adducts. Surface-active dispersing agents are used in admixture with the adducts to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

Suitable surface-active dispersing agents for use in the compositions of this invention are those disclosed in Chemistry of Insecticides, Fungicides, and Herbicides (l. c., pages 280–287) for use with known insecticides and include soaps of resin, alginic, and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, and bentonite and related hydrated aluminum silicates having the property of forming a colloidal gel. Among the other surface-active dispersing agents which are useful in the compositions of this invention are the omega-substituted polyethylene glycols of relative long-chain length, particularly those in which the omega substituent is aryl, alkyl, or acyl. Compositions of the adduct toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus the toxic material may contain a clay as the sole adjuvant, or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus the adduct mixtures admixed with these inert materials which facilitate the mechanical distribution of the adduct in accordance with this invention are those containing the above-listed surface-active dispersing agents and hydrocarbon solvent dispersing agents.

The amount of adduct in the composition with the inert material which facilitates the mechanical distribution of the toxicant will depend upon the type of inert material and the use to which it is to be put. The compositions will generally contain less than about 30% adduct. Agricultural dusts may contain 40-60% adduct as concentrates and will generally contain 10-30% adduct in the form as used. Household sprays will contain from 0.1 to 10% adduct, preferably about 2.5% in deodorized kerosene, but concentrates may contain 25-90% adduct. Agricultural sprays will, likewise, contain 0.1 to 10% of the adduct. Aqueous emulsions will contain sufficient surface-active dispersing agent to maintain an emulsion of the adduct during the spraying process. Concentrates from which emulsions are made may contain 25-90% adduct along with the surface-active dispersing agent.

For many purposes, it may be desirable to use the adduct in combination with other insecticidal toxicants. Many toxicants have a very high knockdown in relatively dilute solutions, but higher concentrations must be used in order to obtain the desired degree of kill. Due to the very high degree of killing power which the adducts of this invention possess, these compounds may be added to such toxicants, thereby enabling the use of much more dilute solutions than would otherwise be possible. Toxicants with which these adducts may be combined include such compounds as rotenone, pyrethrum, and organic thiocyanates such as alkyl thiocyanates, thiocyanoethers such as β-butoxy-β'-thiocyanoethyl ether, and terpene thiocyanoacylates such as isobornyl thiocyanoacetate, fenchyl thiocyanoacetate, isobornyl α-thiocyanopropionate, etc.

The insecticidal compositions of this invention are useful in combatting flies, mosquitoes, roaches, moths, carpet beetles, bedbugs, boll weevils, boll worms, army worms, grasshoppers, and many other pests.

What I claim and desire to protect by Letters Patent is:

1. As a new composition of matter the insecticidally active product of condensation at a temperature in the range of 80°–220° C. of hexachlorocyclopentadiene with a 1,4-dichlorobutene-2 until an insecticidally active condensate is produced therefrom.

2. As a new composition of matter the insecticidally active product of condensation at a temperature in the range of 80°–220° C. of hexachlorocyclopentadiene with trans-1,4-dichlorobutene-2 until an insecticidally active condensate is produced therefrom.

3. As a new composition of matter 2,3-bis[chloromethyl]-1,4,5,6,7,7-hexachlorobicyclo-[2.2.1]-5-heptene.

4. An insecticide comprising the compound of claim 1 and an insecticidal adjuvant as a carrier therefor.

5. An insecticide comprising the compound of claim 2 and an insecticidal adjuvant as a carrier therefor.

6. An insecticide comprising the compound of claim 3 and an insecticidal adjuvant as a carrier therefor.

7. The method of producing an insecticidally active composition of matter which comprises heating hexachlorocyclopentadiene with a 1,4-dichlorobutene-2 at 80°–220° C. until an insecticidally active condensate is produced therefrom.

8. The method of combatting insects which comprises applying to insects and their habitats a composition comprising 5,6-bis-(chloromethyl)-1,2,3,4,7,7 - hexachlorobicyclo-(2.2.1)-2-heptene, said compound being the Dieis-Alder adduct of hexachlorocyclopentadiene and 1,4-dichloro-2-butene, and a carrier therefor.

9. The method of producing an insecticidally active composition of matter which comprises heating hexachlorocyclopentadiene with cis-1,4-dichlorobutene-2 at 80–150° C. until an insecticidally active condensate is produced therefrom.

10. The method of producing an insecticidally active composition of matter which comprises heating hexachlorocyclopentadiene with trans-1,4-dichlorobutene-2 at 110–220° C. until an insecticidally active condensate is produced therefrom.

References Cited in the file of this patent
UNITED STATES PATENTS

| | | |
|---|---|---|
| 2,351,311 | Alder et al. | June 13, 1944 |
| 2,657,168 | Buntin | Oct. 27, 1953 |
| 2,676,132 | Bluestone | Apr. 20, 1954 |

OTHER REFERENCES

Rakoff: "Derivatives of Hexachlorocyclopentadiene," pp. 19-35 (Ph. D. thesis, Purdue University, 1950).